United States Patent
Barron et al.

(10) Patent No.: US 7,142,665 B2
(45) Date of Patent: Nov. 28, 2006

(54) AUTOMATIC GAIN CONTROL FOR AN ADAPTIVE FINITE IMPULSE RESPONSE AND METHOD THEREFORE

(75) Inventors: David L. Barron, Scottsdale, AZ (US); William C. Yip, Phoenix, AZ (US); Sean S. You, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 102 days.

(21) Appl. No.: 10/893,034

(22) Filed: Jul. 16, 2004

(65) Prior Publication Data
US 2006/0013383 A1    Jan. 19, 2006

(51) Int. Cl.
  *H04B 3/23* (2006.01)
(52) U.S. Cl. .............................. 379/406.08; 379/390.03
(58) Field of Classification Search ..............................
  379/388.01–388.03, 390.01–390.03, 406.06–406.09
  See application file for complete search history.

(56) References Cited

U.S. PATENT DOCUMENTS

| 4,600,815 A | * | 7/1986 | Horna ................... 379/406.08 |
| 4,715,063 A | * | 12/1987 | Haddad et al. ........ 379/390.01 |
| 5,646,990 A | * | 7/1997 | Li .......................... 379/406.08 |

* cited by examiner

*Primary Examiner*—Daniel Swerdlow
(74) *Attorney, Agent, or Firm*—Ingrassia, Fisher & Lorenz (57) ABSTRACT

Methods and apparatus are provided for an echo cancellation system. The echo cancellation system comprises an automatic gain control (AGC), a first scalar, a second scalar, a signal summing stage, and an adaptive filter. The AGC is responsive to a first signal in a reference path and a second signal in a near end path. The signal summing stage is between the first and second scalar in the near end path and the first and second scalars are responsive to the AGC. The adaptive filter is responsive to the first signal and provides a third signal to the signal summing stage that corresponds to an echo signal and is subtracted from a signal in the near end path. The second scalar has a scale rate that is the inverse of the scale rate of the first scalar such that unity scaling occurs on the near end path.

14 Claims, 7 Drawing Sheets

AUTOMATIC GAIN CONTROL FOR AN ADAPTIVE FINITE IMPULSE RESPONSE AND METHOD THEREFORE

TECHNICAL FIELD OF THE INVENTION

The present invention generally relates to digital signal processing, and more particularly relates to rapid automatic gain control for an adaptive finite impulse response filter.

BACKGROUND OF THE INVENTION

Communication devices of different types are proliferating at a rapid pace to meet the needs of the consumer. The semiconductor industry has contributed to the rapid increase in use of personal communication devices by continually driving down cost while providing higher performance. In general, performance improvements result when wafer processing permits smaller critical dimensions thus allowing higher circuit density per unit of silicon area. One type of communication device utilizes a handsfree design that allows a user or users to communicate without holding a device. An example of such a handsfree device is the well known teleconferencing system that permits discussions between groups of people. The teleconferencing system provides simultaneous two-way transmission of information on the same communication channel.

A problem associated with a handsfree communication device such as a teleconference system is the generation of an echo that occurs when the speaker output is received by the microphone along with the vocal content intended to be sent. The echo can be quite distracting and in some cases make the communication incoherent. Thus, there is an ongoing effort to provide circuitry that reduces or cancels the echo inherent in these systems.

The long distance telephone network was one of the first applications requiring echo cancellation. In this case, echo is the result of an impedance mismatch between the various links in the communications system, i.e. the handset to telephone line. This type of electrical echo is referred to as line echo and is typically well behaved and therefore easier to cancel than acoustic echo. In general, the echo problem is minimized by using a filter that generates a signal substantially equal to the echo and then subtracting it from the signal received from the microphone.

Although the problem is similar, canceling echo in a teleconference device is significantly more difficult than the long distance telephone network described hereinabove. In particular, a teleconference scenario has a host of variable parameters and a potential for a wider range of acoustic coupling. For example, the distance between the microphone and speaker may vary greatly depending on the room configuration, the teleconference equipment, and the location of the people. The echo cancellation circuitry must cope with the potential wider dynamic range corresponding to substantial changes in magnitude of the voice and echo.

As mentioned previously, handsfree systems are being integrated in many different environments that pose challenging echo cancellation problems. An automobile is an environment in which a handsfree phone system provides increased safety due to the known hazards of driving while holding a cellular phone. One version of a handsfree phone system is integrated with a radio/stereo system such that the received vocal content appears at the output of the stereo speakers of the automobile. Variable spound level is not normally encountered in an office teleconference environment. Typically, in a teleconference the volume is adjusted at the beginning of the conversation. A mobile environment such as in an automobile the sound level may change significantly over short periods of time causing the user to make adjustments to the volume. Such dynamic changes in the voice and echo can render prior art echo cancellation circuitry ineffective on a fixed point processor.

In general, echo cancellation circuitry uses a digital signal processor (DSP) to reduce echo. The DSP is typically programmed as a finite impulse response (FIR) filter which is a non-recursive filter. The output of the FIR filter is a function of the current input and previous input values. An impulse provided to an FIR filter has the characteristic of a response of finite duration; thus, the name finite impulse response.

An echo cancellation circuit integrated in a communication system is simplified by describing the generation of a signal at a far end of the system and providing it to a near end of the system. The near end of the communication system includes a speaker that is acoustically coupled to a microphone. One or more people speak into the microphone on the near end. The output of the microphone comprises the vocal content intended to be sent and the "echo" from the speaker. The FIR filter is used to create an echo cancellation signal that is similar to the echo received by the microphone on the near end. The input of the FIR filter receives the signal sent from the far end to generate the echo cancellation signal. The output of the FIR filter is subtracted from the signal provided by the microphone thereby reducing the magnitude of the echo portion of the signal sent to the far end. An error signal corresponding to the residual echo error is generated. The error signal is fed back to the FIR filter for further adjustments to reduce the echo over time. The time required to reduce the echo to a predetermined minimum level is known as the convergence time.

Prior art approaches to echo cancellation incorporate one or more automatic gain control (AGC) circuits to prevent an overload condition from occurring. In general, the automatic gain control and other circuitry are added to limit the range of operation of the FIR filter. The compression provided by the AGC can boost or attenuate a signal to keep it within a predetermined range. The introduction of an independent AGC function at the front end of an echo canceller detrimentally affects the gain of the system thereby forcing the filter to continuously adapt to a moving target, thus reducing performance. In particular, if the AGC has a time constant that is not significantly larger than the convergence time of a Normalized Least Mean Square (NLMS) filter, then the filter cannot fully compensate for the rapid gain changes introduced by the AGC algorithm. This effectively reduces the performance of the echo canceller. However, rapid AGC changes are required to keep the dynamic range of the input signal and thereby the filter coefficients within the limits of the fixed point processor. For example, prior art echo cancellation circuits will overflow in a condition such as described hereinabove when the volume is rapidly changed in response to the changing environment in an automobile.

Accordingly, it would be desirable to provide an echo cancellation circuit capable of minimizing echo due to acoustic coupling from speaker to microphone. It would further be desirable that the echo cancellation circuitry not overflow under dynamic conditions. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

An acoustic echo canceller algorithm is described herein that prevents coefficient overflow in a finite impulse response (FIR) filter under a wide variety of conditions. In general, a reference signal is scaled to match a predetermined nominal input level. This may not be necessary for some systems depending on the specific input gain. The scaling of the reference signal has no effect on the overall gain of the system. In other words, scaling affects the speaker output and the acoustic echo path equally. Implementation of a reference scaling algorithm is selected to have a long time constant such that little or no distortion is detectable in the reference signal. This of course, does not include the stereo amplifier's gain control in the automobile. The gain control is typically under user control and is why the rapid AGC is necessary.

In an embodiment of the system, the signal is broken into frames of information. Each frame of information corresponds to a predetermined number of digital samples of an analog signal. For example, each frame comprises from one to 80 samples (or more) depending on the required delay through the system and available real-time processing power. The sampling rate correlates to the frequency response of the system. A digital signal processor (DSP) is designed to be efficient in handling a large number of mathematical computations typically needed for a complex filtering algorithm. In an embodiment of the system, a finite impulse response (FIR) filter is implemented using the DSP. Sampling and digital signal processing occur concurrently. Thus, a frame of information is processed by the DSP unit as a subsequent frame is being sampled. The processing of frames by the DSP continues until the signal is terminated.

The system is described as comprising a near end and a far end to simplify discussion of echo cancellation. The near end includes a speaker and a microphone. A signal from the far end is output by the speaker at the near end. The speaker output is acoustically coupled to the microphone at the near end. Thus, the intended near end audio input is combined with the near end speaker output as the microphone picks up the content from both sources. In an embodiment of the system, an adaptive filter (FIR filter) is coupled to the near end signal path which generates a cancellation signal that is a replica of the acoustically coupled output from the near end speaker. This is commonly referred to as the echo. The output signal from the adaptive filter cancels the echo from the signal generated by the near end microphone. The resultant signal (with the echo subtracted out) is transmitted to the far end. Ideally, the acoustically coupled input is cancelled such that the echo is noise level and the far end listener does not hear any echo. The single direction, far end/near end description of the system is for simplification. It should be noted that a communication system is typically two way with information being sent between the near end and far end. Although echo cancellation is described only at the near end in the embodiments hereinbelow, the echo cancellation system disclosed can also be used or implemented at the far end to reduce and eliminate echo at that end.

In general, the residual echo error is used to adapt the filter's coefficients. The residual echo error is the difference between the actual echo coupled to the microphone on the near end and the echo canceling signal generated by the adaptive filter. Initially, the echo path impulse response is unknown. The adaptive filter makes adjustments based on the residual echo error to reduce the error to zero. The amount of time needed to reduce the residual echo error below a predetermined threshold is known as the convergence time of the filter. The predetermined threshold is selected to be at a level that allows acceptable communication between the near and far end. Typically, the residual echo error is reduced to a level that is not audible to the receiving party.

In an embodiment of the echo cancellation system, a normalized least mean square (NLMS) algorithm provides an efficient methodology for determining filter coefficients. The algorithm minimizes the mean square of the residual echo signal error signal for each sample. The coefficients are scaled so that the maximum coefficient moves towards a predefined value. The desired maximum coefficient value is maintained indirectly by scaling the near end signal relative to the reference signal. The scale factor is the ratio of the energy of the reference signal to the energy of the near end signal multiplied by a constant as represented in Equation 1.

$$\alpha(n) = C\, Ex(n)/Ey(n) \qquad \text{Equation 1}$$

The delta scalar corresponds to a change in energy from a previous frame of information to a current frame of information. Scaling the coefficients by a delta scalar prevents coefficient overflow by keeping them within the dynamic range of the digital signal processing unit. The change in gain introduced by the delta scalar is cancelled by scaling the near end signal by the absolute scalar. Moreover, this strategy for scaling can be applied rapidly with very short duration gain changes since the overall gain of the system does not change. Thus, the dynamic range of the filter is increased. Finally, the scaling applied at the near end input is removed at the output after the filter has canceled the echo. Removing the scaling at the output of the near end signal path ensures that the near end audio content (to be sent to the far end) is not distored by the rapid gain changes that have been applied thereby producing a more natural sounding output. Equation 2 represents the scaling methodology where $\alpha$ is the absolute scalar, $\Delta\alpha$ is the delta scalar, and n is the nth sample.

$$\Delta\alpha = \alpha(n)/(\alpha(n-1)) \quad \text{Equation 2}$$

Figure 1:
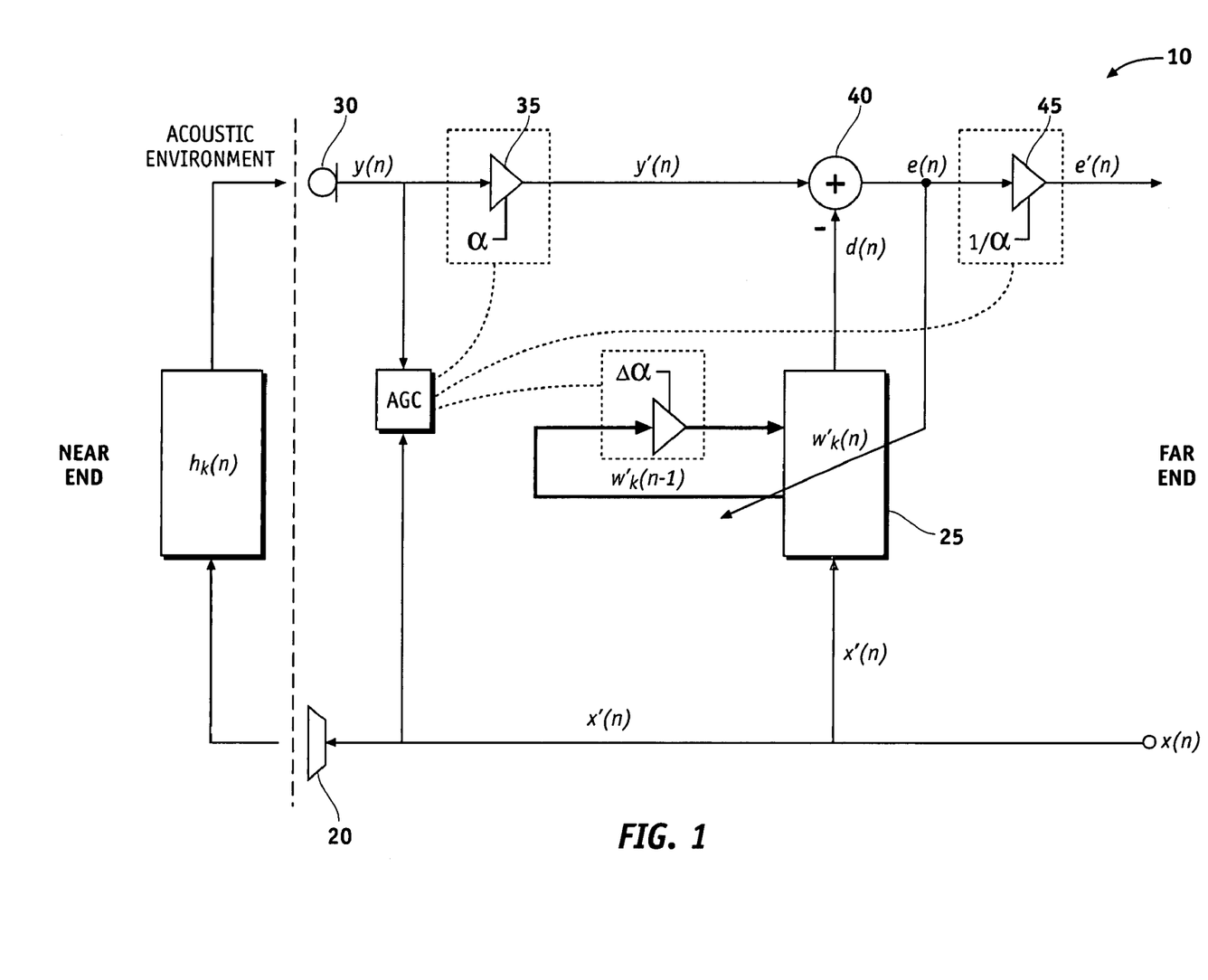
FIG. 1 is a schematic diagram of a communication system in accordance with a first embodiment of the present invention.

FIG. 1 is a schematic diagram of a communication system 10 in accordance with a first embodiment of the present invention. The system provides communication between a near end and a far end. Acoustic coupling is shown at the near end which produces an echo signal. In particular, a signal from the far end is acoustically output by a speaker 20 on the near end. A microphone 30 picks up the audio content at the near end which is intended to be sent to the far end and also receives a portion of the acoustic output from speaker 20. The acoustic output from speaker 20 is modified by the acoustic environment at the near end before it is received by microphone 30. The acoustic output from speaker 20 received by microphone 30 is the echo signal. The impulse response of the acoustic environment is represented by the function $h_k(n)$. The far end signal is represented by the function x(n), and the near end signal is represented by the function y(n). An adaptive filter 25 has filter coefficients $w'_k(n)$ adaptive filter 25 generates a signal d(n) that is a replica of the near end signal output by speaker 20 and received by microphone 30.

In the case when there is no input from the near end, the near end signal y(n) is primarily the echo signal that is the result of the scaled far end signal x'(n) transformed by the impulse response of the acoustic environment $h_k(n)$. The description hereinbelow describes a situation when the acoustic signal received by microphone 30 comprises primarily the output from speaker 20.

The output of scalar 15 is coupled to an input of speaker 20 and a first input of adaptive filter 25. Speaker 20 outputs an acoustic signal to the acoustic environment at the near end corresponding to the far end signal x(n). Microphone 30 picks up the output from speaker 20 which is modified by the acoustic environment. The near end echo signal y(n) is represented by Equation 3.

$$y(n) = \sum_{n=0}^{N-1} h_k(n)x'(n-k) \quad \text{Equation 3}$$

The near end echo signal y(n) is then scaled by $\alpha$. In an embodiment of the system, the scaling is calculated by a fast automatic gain control (AGC) algorithm. A scalar 35 has an input coupled to microphone 30. The scaled equation is represented by Equation 4.

$$y'(n) = \alpha y(n) = \alpha \sum_{n=0}^{N-1} h_k(n)x'(n-k) \quad \text{Equation 4}$$

The scaled near end echo signal y'(n) is estimated by filtering the scaled far end signal x'(n) using the adapted coefficients $w'_k(n)$ from adaptive filter 25. Adaptive filter 25 outputs an estimated signal d(n) corresponding to scaled near end echo signal y'(n) represented by Equation 5.

$$d(n) = \sum_{k=0}^{N-1} w'_k(n)x'(n-k) \quad \text{Equation 5}$$

In an embodiment of the system, a numerical least mean squares algorithm (NLMS) is used to rapidly generate a signal that will cancel scaled near end echo signal y'(n). The NLMS algorithm or other similar algorithms provides a methodology to efficiently generate the optimum filter coefficients. A residual echo error signal e'(n) is the difference between the estimated signal generated by adaptive filter 25 and scaled near end echo signal y'(n). The NLMS algorithm minimizes the mean square of residual echo error signal e'(n) at each adaptation step (or sample). Equation 6 illustrates an example of how coefficients are adapted in a typical NMLS algorithm.

$$w_k(n+1) = w_k(n) + \mu\left[e(n)x'(n-k) \Big/ \left(1 \Big/ N\left(\sum_{n=0}^{N-1} x'(n-i)\right)\right)\right] \quad \text{Equation 6}$$

In Equation 6, n is the step size parameter and limits the step size of the NLMS algorithm to some nominal value. N is a number representing the length of the filter. It should be noted that the filter spans several sample times (the length of the filter); thus, the coefficients cannot be scaled by $\alpha$. The change in $\alpha$ from sample to sample (or from frame to frame in the case of block processing) needs to be calculated and then a delta scalar $\Delta\alpha$ generated and applied to the coefficients. The update to the coefficients is shown in Equation 7.

$$w'_k(n) = \alpha_n w_k(n) \quad \text{Equation 7}$$

The estimated echo d(n) generated by adaptive filter 25 can be written as a function of $\alpha$ as shown in Equation 8. The scaling between the actual echo and the estimated echo are now substantially equal and thus will not impact performance of adaptive filter 25.

$$d(n) = \sum_{k=0}^{N-1} w_k(n)x'(n-k) \quad \text{Equation 8}$$

The scaled near end echo signal y'(n) and the estimated signal d(n) is coupled to a signal summing stage 40. In an embodiment of the system, the estimated signal d(n) is subtracted from the scaled near end echo signal y'(n) resulting in a residual echo signal e'(n). The residual echo signal e'(n) is represented by Equation 9.

$$e'(n) = y'(n) - d(n) \quad \text{Equation 9}$$
$$= \alpha\sum_{k=0}^{N-1} h_k(n)x'(n-k) - \sum_{k=0}^{N-1} w_k(n)x'(n-k)$$

The automatic gain control factor $\alpha$ is then removed by scalar 45 reducing the signal by a factor of $1/\alpha$. The output of scalar 45 is coupled to the far end and provides a signal e(n) presented in Equation 10.

$$e(n)=(1/\alpha)e'(n) \quad \text{Equation 10}$$

In the communication system 10, two automatic gain control (AGC) paths are provided. This is represented by automatic gain control (AGC) 50. A first path comprises a slow moving AGC algorithm in the reference signal path (initiated from the far end) having a characteristic long time constant commonly implemented in prior art echo cancellation circuits. For example, a time constant of several seconds is used in the first path AGC algorithm. The second automatic gain control path is in the echo path from the near end. The second AGC path comprises a fast responding AGC algorithm that has a relatively short time constant in relation to the first AGC path. In general, the time constant for the fast responding AGC algorithm is less than 100 milliseconds. Typically, the time constant is between 1–10 milliseconds. Thus, there is more than an order of magnitude difference in the time constants used for the first and second path AGC algorithms.

The fast responding AGC algorithm in the echo path maintains the maximum coefficient of adaptive filter 25 at a relatively constant value. This allows echo cancellation even under dynamic conditions via incremental changes that prevent an overflow condition. In particular, AGC unit 50 controls the scaling of the signals y'(n), d(n), and e(n) in the near end path, and relative to one another in a controlled manner, respectively through scalars 35, 55, and 45. Maintaining the maximum coefficient at the constant value reduces the dynamic range of coefficients of adaptive filter 25 and prevents overflow of the coefficients. The possibility of overflow greatly increases without the fast responding AGC when implementing the echo canceling algorithm on a fixed point digital signal processing machine. The AGC algorithm for echo cancellation is described hereinbelow in equations 11–17.

In system 10, a frame based solution is utilized to reduce processing overhead. It should be noted that a sample based approach could also be implemented with equivalent results. A frame contains M samples in length and a filter length of N. The coefficient delta scalar $\Delta\alpha$ is calculated in Equation 11. The delta scalar $\Delta\alpha$ is the current maximum coefficient divided by the desired maximum value r. All scaling is based on the maximum coefficient to allow the fast responding AGC algorithm to keep the coefficients in a specific range.

It should be noted that there are two different methods for calculating the delta scalar. The first method calculates alpha as the ratio of the reference signal energy to the near end signal energy and then calculates the change in this ratio from one frame to the next. The second method determines the current maximum filter coefficient and calculates a scalar that will drive the magnitude of the maximum coefficient towards a predetermined value (for example 0.75). Alpha is then derived from this scalar by interpreting it as a delta scalar. This alpha is then applied to the near end input signal. Method 1 is shown in Equation 1. Method 2 is shown in Equation 11.

$$\Delta\alpha=\text{Coef}_{max}/r\text{(coefficient delta scalar)} \quad \text{Equation 11}$$

The near end scalar is derived from the coefficient delta scalar to maintain an equivalent gain through adaptive filter 25. In an embodiment of the AGC algorithm, the near end scalar is an absolute scalar value. The near end scalar is shown in Equation 12.

$$\alpha(m)=\Delta\alpha(\alpha(m-1))\text{(near end scalar)} \quad \text{Equation 12}$$

As mentioned previously, all scaling is performed on a frame basis outside the filter loop to reduce processor overhead. In system 10, the input vector y and the filter coefficients w'$_k$(n) are scaled once per frame outside the filter loop. Equations 13 and 14 respectively show near end signal scaling and filter coefficient scaling.

$$y'(i)=\alpha(m)y(i)(n\leq i<n+M) \quad \text{Equation 13}$$

$$w'_k(n)=\Delta\alpha(w'_k(n-1))(0\leq k<N) \quad \text{Equation 14}$$

An inner loop performs the echo estimation filtering and echo subtraction as well as the coefficient update. In an embodiment of system 10, the inner loop is performed on a sample-by-sample basis. The inner loop is defined by Equations 15 and 16 where Equation 15 relates to the cancellation of the echo signal and equation 16 relates to the updating of the coefficients.

$$e'(n) = y'(n) - \sum_{n=0}^{N-1} w'_k(n)x'(n-k) \quad \text{Equation 15}$$

$$w'_k(n+1) = w'_k(n) + \mu\left[\left(e'(n)x'(n-k)\right) \bigg/ \left((1/N)\sum_{i=0}^{N-1} x'(n-i)\right)\right] \quad \text{Equation 16}$$

A final step in the AGC algorithm is the removal of any scaling used at the input during equation 13. The rapid AGC scaling methodology allows very fast gain changes to occur at the input that would severely distort the near end signal when present. Thus to prevent the distortion, a reverse of the gain changes are applied before the signal e(n) is output. The change in gain at the near end is represented by Equation 17.

$$e(n)=e'(n)/\alpha(m) \quad \text{Equation 17}$$

Figure 2:
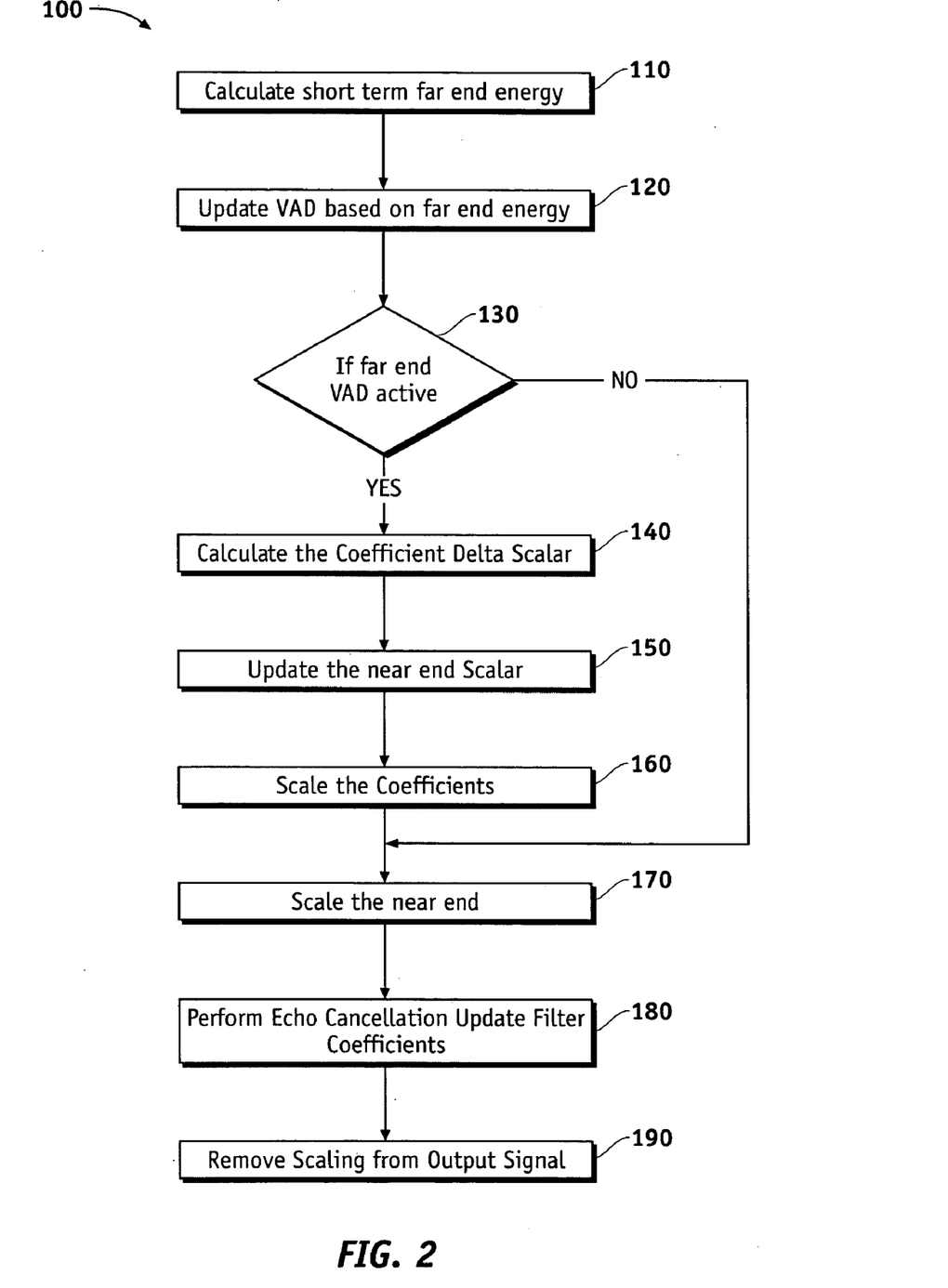
FIG. 2 is a flow chart describing the implementation of an automatic gain control algorithm for echo cancellation.

FIG. 2 is a flow chart 100 describing the implementation of the automatic gain control algorithm for echo cancellation. The implementation is a block approach processing information frame by frame. Initially, as disclosed in box 110, the short term far end energy is calculated. A box 120 updates a Voice Activity Decision (VAD) flag. The VAD flag is updated corresponding to the energy level of the far end signal and indicates activity at the far end (ex. a far end speaker is talking). If there is activity at the far end, decision box 130 selects a path that calculates the Coefficient Delta Scalar (box 140), updates the Near end Scalar (box 150), and Scales the Coefficients (box 160). The scalars are updated to adjust the filter coefficients such that they stay within the boundaries of the digital signal processor. For example, the digital signal processor is a fixed integer machine, and the delta scalar calculation and scalar updates prevent the coefficients from overflowing even in a dynamic environment. Boxes 140, 150, and 160 are bypassed if the activity level is below a predetermined threshold. For example, a far end speaker is not talking, thus there is no reference signal and therefore no echo signal, thus the calculation/update of alpha is not valid.

The near end signal is scaled every frame regardless of the VAD decision as indicated in box 170 (Scale the Near end). When the delta scalar is not changed, the delta from the previous frame will be "1" which implies the near end scalar does not change, but the absolute scaling is still applied. Following the scaling of box 170, the adaptive filter performs a coefficient update on the block of samples making up a frame of information. An estimated echo signal is generated by the adaptive filter which is subtracted from the scaled near end signal to cancel the echo. Echo cancellation is performed and the filter coefficients updated as shown at 180. The last step in flow chart 100 is to remove scaling that occurred at the input. Removing the scaling (190) allows near end originated speech to pass through the system undistorted.

Figure 3:
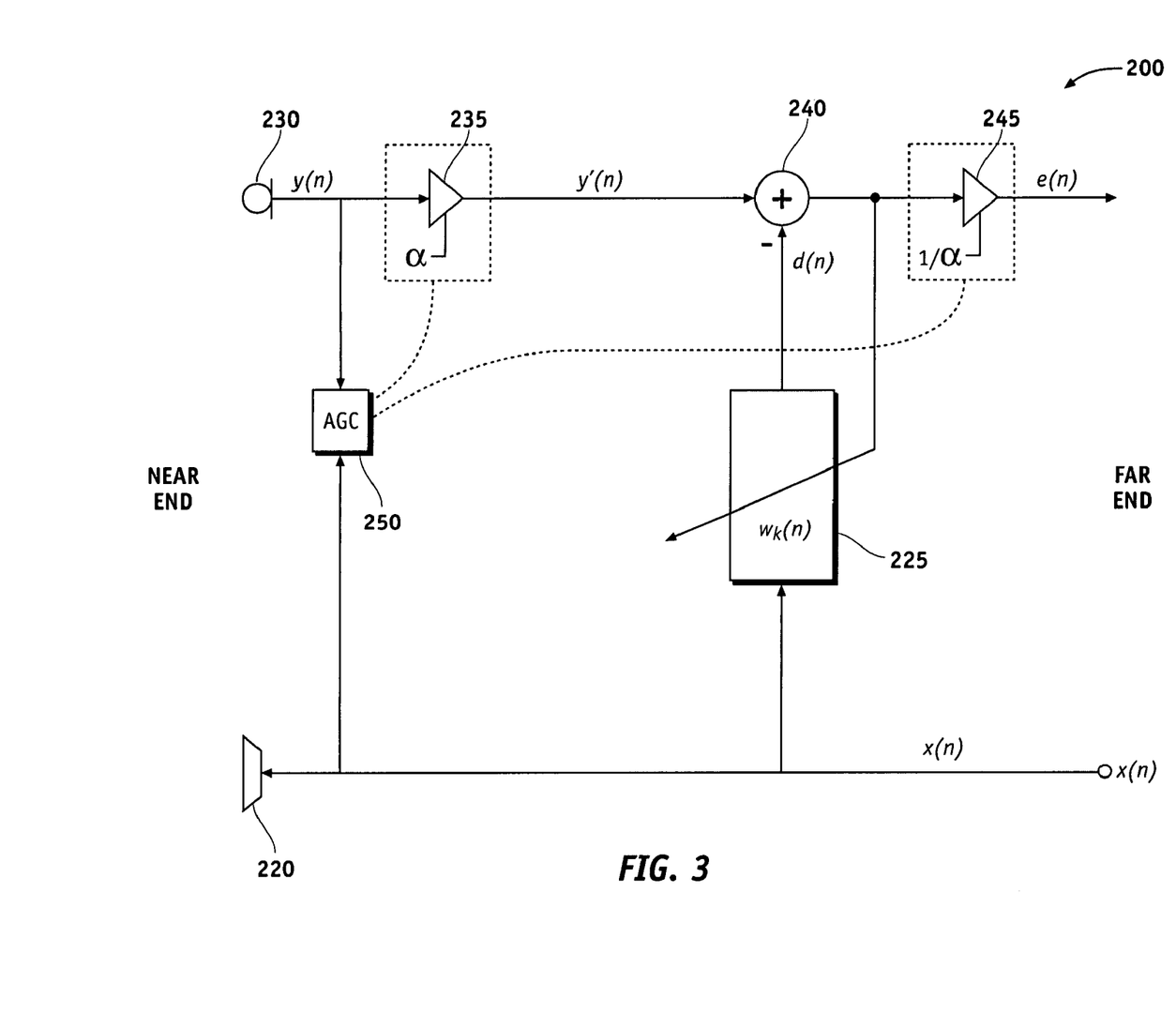
FIG. 3 is a schematic diagram of a communication system in accordance with a second embodiment of the present invention.

FIG. 3 is a schematic diagram of a communication system 200 in accordance with a second embodiment of the present invention. FIGS. 4–7 described hereinbelow are alternate embodiments illustrating different configurations for echo cancellation that utilize one or more of the techniques described in connection with FIG. 1. Communication system 200 does not include the delta scalar that modifies the coefficients in the adaptive filter of FIG. 1. Referring to FIG. 3, a signal x(n) from the far end of communication system 200 is coupled to a speaker 220, an adaptive filter 225, and an AGC 250. Speaker 220 outputs an acoustic signal to an acoustic environment at the near end. Under normal operating conditions, microphone 230 outputs a signal y(n) that includes audio input from the near end and acoustic output from speaker 220.

The echo signal is a portion of the signal y(n) corresponding to the acoustic output from speaker 220 that is modified by the acoustic environment and received by microphone 230. The echo signal is cancelled or reduced by the echo cancellation circuitry of the communication system 200. The output of microphone 230 is coupled to AGC 250 and a scalar 235. A signal summing stage 240 is coupled to scalar 235 and to adaptive filter 225. Scalar 235 is responsive to AGC 250 to scale the signal y(n) such that the maximum coefficient of adaptive filter 225 are maintained at an approximate fixed value. Thus, adaptive filter 225 is capable of echo cancellation in a dynamic environment without overflow when compared to prior art echo cancellation systems.

Adaptive filter 225 receives the reference signal x(n) from the far end and an error signal from the output of signal summing stage 240 to produce a signal d(n). Adaptive filter 225 generates a signal d(n) that mimics or is similar to the scaled signal y(n). Ideally, the error signal is zero corresponding to the scaled signal y(n) being perfectly replicated by adaptive filter 225. In practice, this does not occur and the error signal is used to modify/adjust the coefficients of adaptive filter 225 to reduce the error signal thereby keeping the echo signal at a level that is not audible at the far end.

The output of signal summing stage 240 is coupled to a scalar 245. Scalar 245 outputs a signal e(n) that is provided to the far end that corresponds to the audio input received by microphone 230 on the near end with the acoustic signal output by speaker 220 (the echo signal) subtracted out. Scalars 235 and 245 are both responsive to AGC 250 and scale respectively by α and 1/α. Thus, the scaling has no net affect on the near end signal path since the scaling α is converted back to unity by the inverse 1/α scaling of scalar 245. The magnitude of the scaling is controlled by AGC 250 to maintain adaptive filter 225 from going into overflow. AGC 250 responds rapidly having a short time constant measured in the millisecond range.

Figure 4:
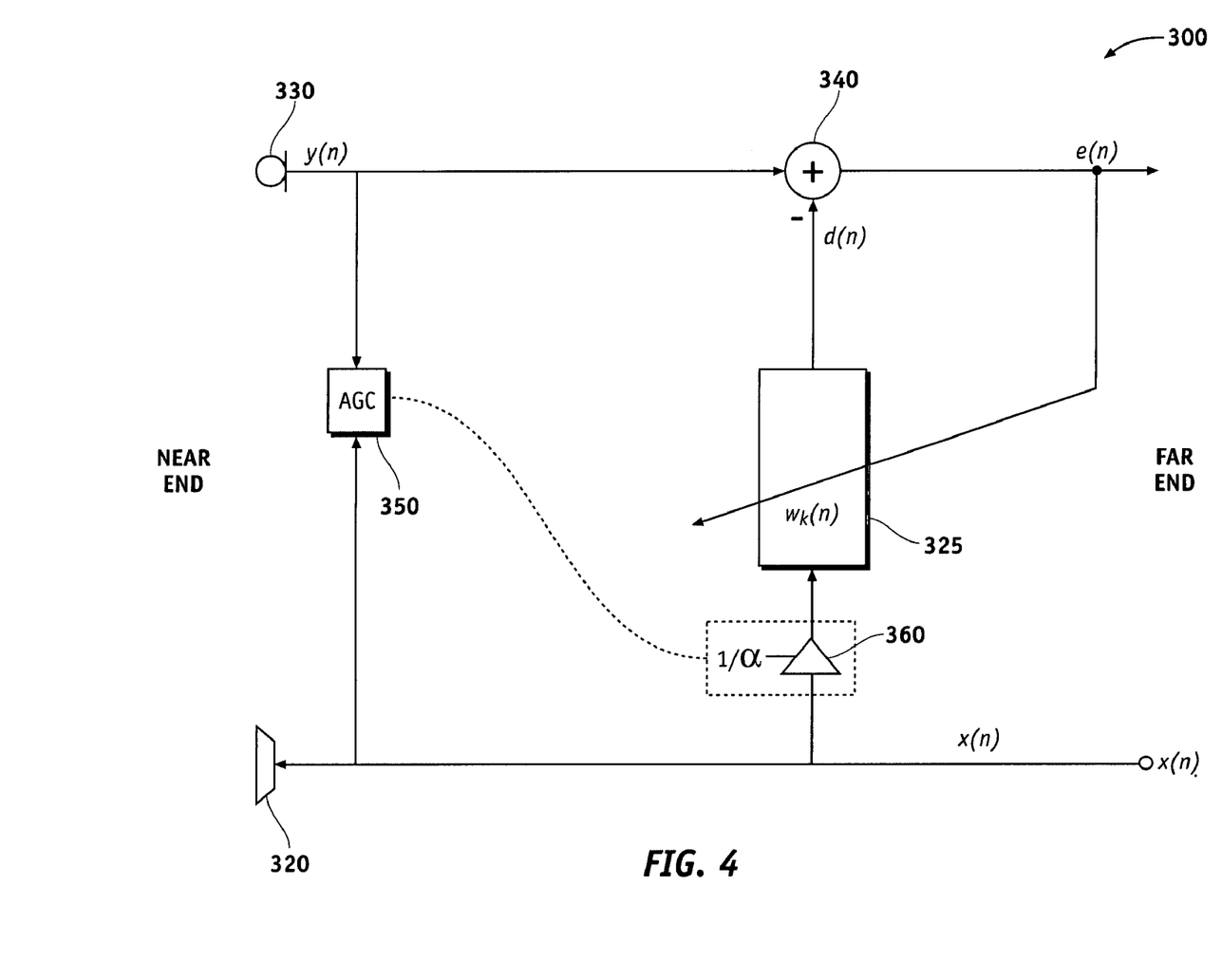
FIG. 4 is a schematic diagram of a communication system in accordance with a third embodiment of the present invention.

FIG. 4 is a schematic diagram of a communication system 300 in accordance with a third embodiment of the present invention. Communication system 300 comprises a speaker 320, an adaptive filter 325, a microphone 330, an automatic gain control (AGC) 350, and a signal summing stage 340. Automatic gain control 350 is a fast response AGC with a short time constant for maintaining the input signal level to adaptive filter 325 at a level that prevents overflow. A signal x(n) from the far end of communication system 300 is coupled to a speaker 320 which outputs an acoustic signal to an acoustic environment at the near end. In general, microphone 330 outputs a signal y(n) that includes audio input from the near end and acoustic output from speaker 320.

The signal x(n) is coupled to near end speaker 320, automatic gain control 350, and scalar 360. Microphone 330 receives audio input from the near end and acoustic output from speaker 320. A signal y(n) is output by microphone 330 corresponding to the near end audio input and acoustic output from speaker 320. The component of signal y(n) that is related to the acoustic output from speaker 320 is an echo signal. Signal y(n) is coupled to signal summing stage 340 and AGC 350. Scalar 360 scales signal x(n) by 1/α, and the scaled signal x(n) is provided to adaptive filter 325. Adaptive filter 325 generates a signal d(n) that approximates the echo signal and is coupled to signal summing stage 340.

Signal summing stage 340 subtracts d(n) from the signal y(n) to cancel the echo signal and outputs a signal e(n) corresponding to the audio input from the near end. The signal e(n) is provided to the far end. Under normal operation the signal e(n) corresponds to the audio input provided at the near end. Ideally, the echo signal is reduced by adaptive filter 325 to a level that is not audible at the far end.

In an embodiment of communication system 300, the signal e(n) is the echo signal that corresponds to the difference between d(n) and y(n). The echo signal couples to adaptive filter 325 to adjust the coefficients. The coefficients are adjusted during this period when the signal is primarily the acoustic output from speaker 320 to reduce the echo signal to an inaudible level.

Automatic gain control 350 is responsive to scalar 360. As mentioned previously, scalar 360 scales the signal x(n) by 1/α. Automatic gain control 350 has a short time constant in approximately the millisecond range. Under dynamic conditions, AGC 350 in conjunction with scalar 360 responds rapidly to scale the signal x(n) to prevent overflow in adaptive filter 325.

Figure 5:
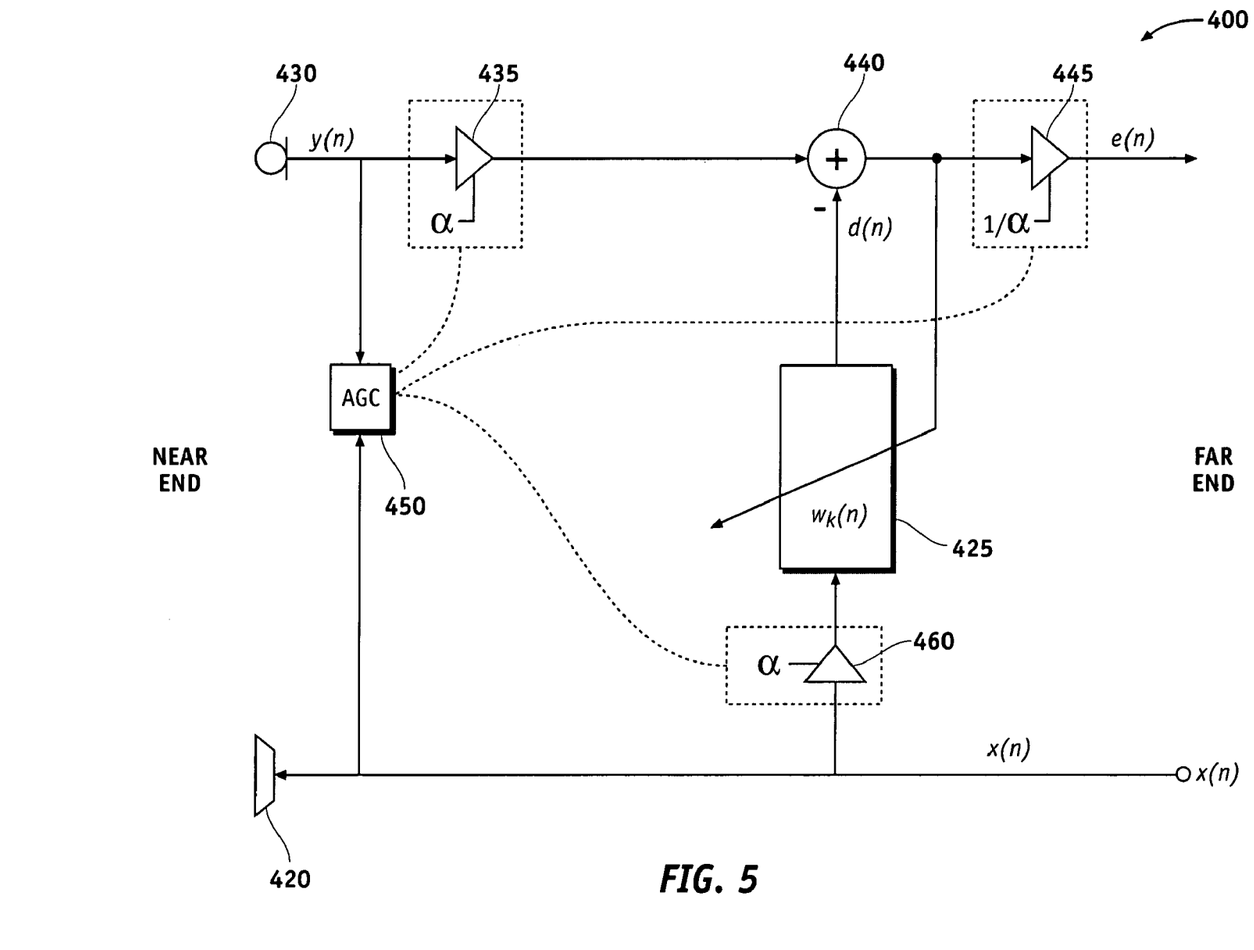
FIG. 5 is a schematic diagram of a communication system in accordance with a fourth embodiment of the present invention.

FIG. 5 is a schematic diagram of a communication system 400 in accordance with a fourth embodiment of the present invention. Communication system 400 comprises a speaker 420, an adaptive filter 425, a microphone 430, a scalar 435, signal summing stage 440, a scalar 445, an automatic gain control (AGC) 450, and a scalar 460. Automatic gain control 450 is a fast response AGC with a short time constant for preventing adaptive filter 425 from going into overflow. A signal x(n) from the far end of communication system 400 is coupled to a speaker 420 which outputs an acoustic signal to an acoustic environment at the near end. In general, microphone 430 outputs a signal y(n) that includes audio input from the near end and acoustic output from speaker 420.

The signal x(n) is coupled to near end speaker 420, automatic gain control 450, and scalar 460. Microphone 430 receives audio input from the near end and acoustic output from speaker 320. The signal y(n) is output by microphone 430 corresponding to the near end audio input and acoustic output from speaker 420. The component of signal y(n) that is related to the acoustic output from speaker 420 is an echo signal. Signal y(n) is coupled to scalar 435 and AGC 450. Scalar 435 scales y(n) by α, and the scaled signal y(n) is coupled to signal summing stage 440. Scalar 460 scales signal x(n) by α and the scaled signal x(n) is provided to adaptive filter 425. Adaptive filter 425 generates a signal d(n) that approximates the echo signal and is coupled to signal summing stage 440.

Signal summing stage 440 subtracts d(n) from the scaled signal y(n) to cancel the echo signal and has an output coupled to scalar 445. Scalar 445 scales the signal by 1/α.

Thus, the net scaling on the near end path is unity since scalars 435 and 445 are scale respectively at α and 1/α. A signal e(n) is output by scalar 445 that corresponds to the audio input from the near end is generated at the output of scalar 445 and is provided to the far end. The output from signal summing stage 440 is coupled to adaptive filter 425. Ideally, the echo signal is reduced by adaptive filter 425 to a level that is not audible at the far end.

In system 400, the signal at the output of signal summing stage 440 is the echo signal and is the difference between d(n) and y(n). The echo signal (output of signal summing stage 440) is coupled to adaptive filter 425 to adjust the coefficients so as to reduce the echo signal during this period when the signal is primarily the acoustic output of speaker 420.

Automatic gain control 450 is responsive to scalars 435, 445, and 460. As mentioned previously, scalar 460 scales the signal x(n) by α. Automatic gain control 450 has a short time constant in approximately the millisecond range. Under dynamic conditions, AGC 450 in conjunction with scalars 435, 445, and 460 responds rapidly to scale the signal x(n) to prevent overflow in adaptive filter 425.

Figure 6:
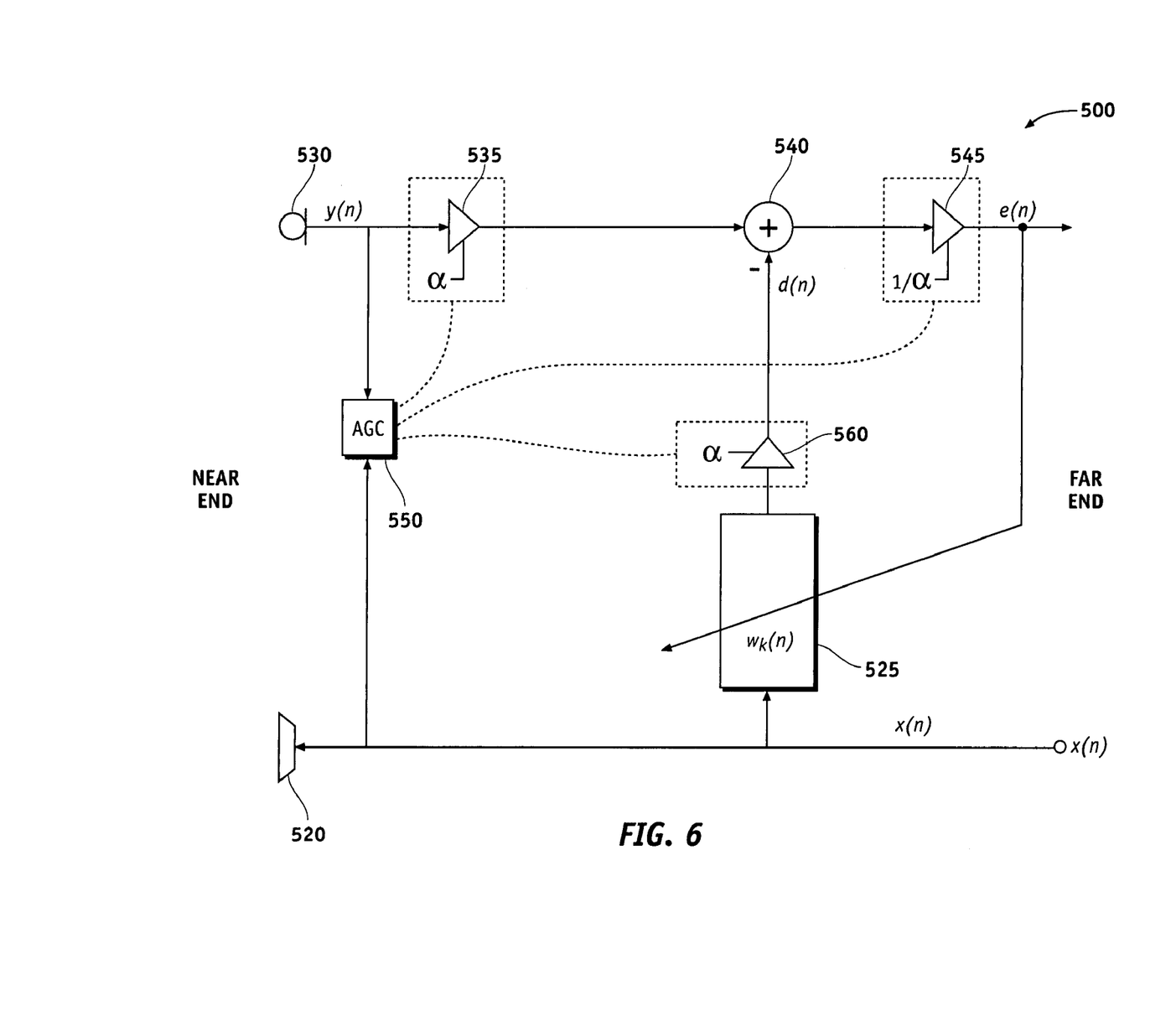
FIG. 6 is a schematic diagram of a communication system in accordance with a fifth embodiment of the present invention.

FIG. 6 is a schematic diagram of a communication system 500 in accordance with a fifth embodiment of the present invention. Communication system 500 comprises a speaker 520, an adaptive filter 525, a microphone 530, a scalar 535, signal summing stage 540, a scalar 545, an automatic gain control (AGC) 550, and a scalar 560. Automatic gain control 550 is a fast response AGC with a short time constant for preventing overflow in adaptive filter 525. A signal x(n) from the far end of communication system 500 is coupled to a speaker 520 which outputs an acoustic signal to an acoustic environment at the near end. In general, microphone 530 outputs a signal y(n) that corresponds to audio input from the near end and acoustic output from speaker 520.

The signal x(n) is coupled to near end speaker 520, automatic gain control 550, and adaptive filter 525. Microphone 530 receives audio input from the near end and acoustic output from speaker 520. The signal y(n) corresponding to the near end audio input and acoustic output from speaker 520 appears at the output of microphone 530. The component of signal y(n) that is related to the acoustic output from speaker 520 is an echo signal. Signal y(n) is coupled to scalar 535 and AGC 550. Scalar 535 scales y(n) by α, and the scaled signal y(n) from scalar 535 is coupled to signal summing stage 540. Adaptive filter 525 receives the signal x(n) and outputs a signal corresponding to the echo signal component of y(n). The output from adaptive filter 525 is coupled to scalar 560 which scales the output signal of adaptive filter 525 by α as is indicated by signal d(n). The signal d(n) approximates the echo signal and is coupled to signal summing stage 540.

Signal summing stage 540 subtracts d(n) from the scaled signal y(n) to cancel the echo signal and outputs a signal to scalar 545, which in turn scales the signal by 1/α. Thus, the net scaling on the signal in the near end path is unity since scalars 535 and 545 are scaled respectively at α and 1/α. A signal e(n) is provided that corresponds to the audio input from the near end is provided to the far end by scalar 545. The signal e(n) is also coupled to adaptive filter 525. Ideally, the echo signal is reduced by adaptive filter 525 to a level that is not audible at the far end.

In communication system 500, the echo signal provided by signal summing stage 540 is the difference between d(n) and y(n). This signal is then coupled to scalar 545 that scales the echo signal by 1/α. The signal e(n) is the output of scalar 545. The coefficients are adjusted during this period when the signal is primarily the acoustic output from speaker 520 to reduce the echo signal to an inaudible level.

Automatic gain control 550 is responsive to scalars 535, 545, and 560 and has a short time constant in approximately the millisecond range. Under dynamic conditions, AGC 550, in conjunction with scalars 535, 545, and 560, responds rapidly to scale signals to prevent overflow in adaptive filter 525.

Figure 7:
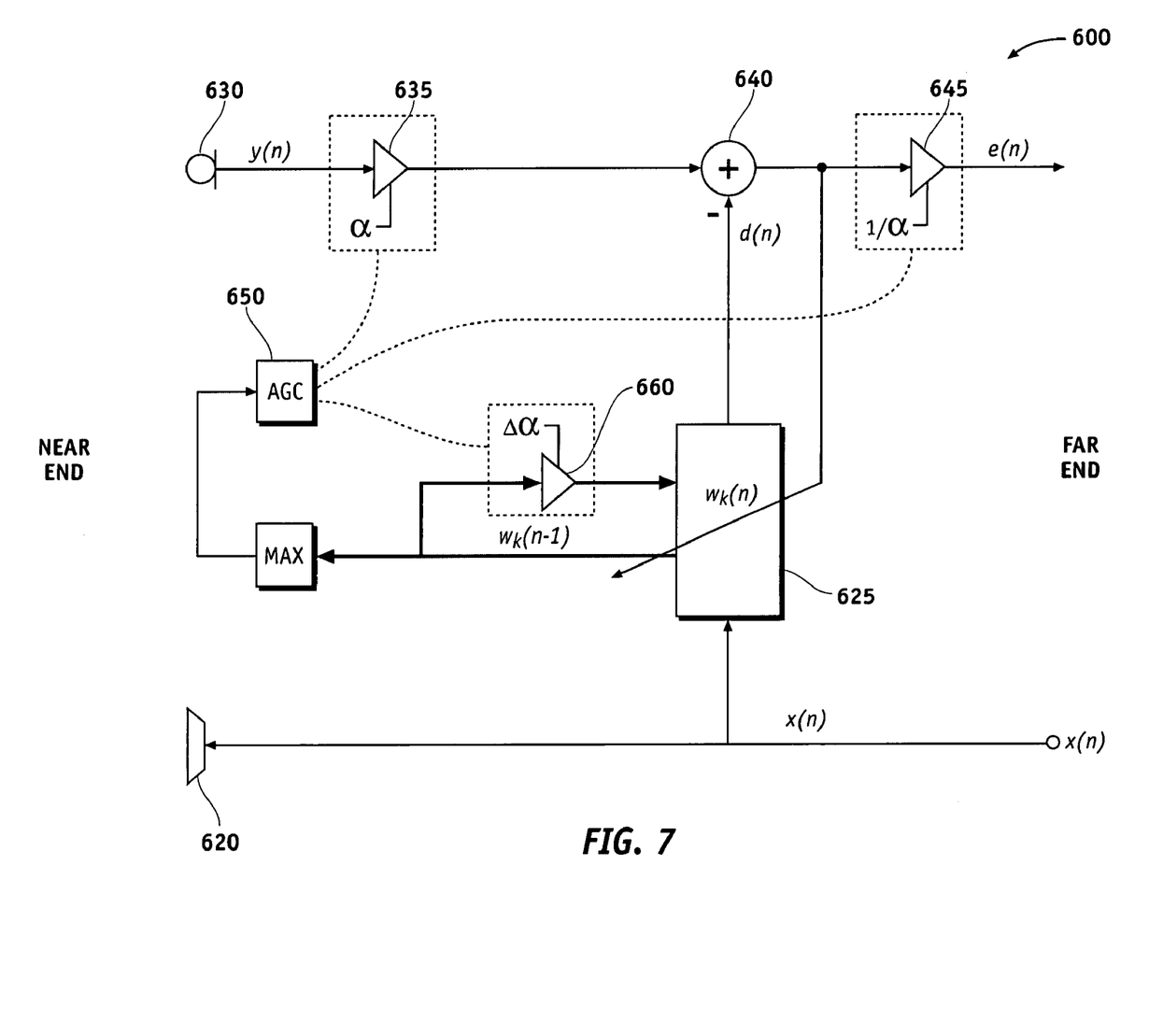
FIG. 7 is a schematic diagram of a communication system in accordance with a sixth embodiment of the present invention.

FIG. 7 is a schematic diagram of a communication system 600 in accordance with a sixth embodiment of the present invention. Communication system 600 comprises a speaker 620, an adaptive filter 625, a microphone 630, a scalar 635, signal summing stage 640, a scalar 645, an automatic gain control (AGC) 650, and a scalar 660. Automatic gain control 650 is a fast response AGC with a short time constant for changing the coefficients of adaptive filter 625 to prevent overflow. A signal x(n) from the far end of communication system 600 is coupled to a speaker 620 which outputs an acoustic signal to an acoustic environment at the near end. In general, microphone 630 outputs a signal y(n) that includes audio input from the near end and acoustic output from speaker 620.

The signal x(n) is coupled to near end speaker 620 and adaptive filter 625. Microphone 630 receives audio input from the near end and acoustic output from speaker 620. The signal y(n) corresponds to the near end audio input from microphone 630 and acoustic output from speaker 620. The component of signal y(n) that is related to the acoustic output from speaker 620 is an echo signal. Signal y(n) is coupled to scalar 635 and scales y(n) by α. The scaled signal y(n) from scalar 635 is coupled to signal summing stage 640. An output d(n) of adaptive filter 625 approximates the echo signal and is coupled to signal summing stage 640.

Signal summing stage 640 subtracts d(n) from the scaled signal y(n) to cancel the echo signal and outputs a signal that is coupled to scalar 645 and adaptive filter 625. Scalar 645 scales the signal by 1/α. Thus, the net scaling on the near end path is unity since scalars 635 and 645 scaled respectively at α and 1/α. AGC 350 is coupled to adaptive filter 625. Similarly, scalar 660 is coupled to adaptive filter 660 that adjusts the coefficients from a previous frame (or cycle) by a Δα (scalar) to continuously modify the coefficients to prevent overflow. A signal e(n) is output by scalar 645 that corresponds to the audio input from the near-end. The signal e(n) is provided to the far end. Ideally, the echo signal is reduced by adaptive filter 625 to a level that is not audible at the far end.

In communication system 600, the signal output by signal summing stage 640 is the echo signal which is the difference between d(n) and y(n). The echo signal (output of signal summing stage 640) is then coupled to scalar 645 which scales the echo signal by 1/α. The signal e(n) is the output of scalar 645. The coefficients are adjusted during this period when the signal is primarily the acoustic output from speaker 620 to reduce the echo signal to an inaudible level.

Automatic gain control 650 is responsive to scalars 635, 645, and 660. As mentioned previously, scalar 660 scales the coefficients each frame (or cycle) by Δα. This fine adjustment occurs continuously allowing finer control over echo cancellation. Automatic gain control 650 has a short time constant in approximately the millisecond range. Under dynamic conditions, AGC 650 in conjunction with scalars 635, 645, and 660 responds rapidly to scale the signal x(n) to prevent overflow in adaptive filter 625.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An echo cancellation system comprising:
    an automatic gain control unit for receiving a first signal and a second signal, said automatic gain control unit responsive to said second signal having an automatic gain control algorithm, wherein said automatic gain control algorithm has a time constant in a range of 1–10 milliseconds;
    a first scalar coupled to receive said second signal and providing a scaled second signal, said first scalar being responsive to said automatic gain control;
    a signal summing stage coupled said first scalar for receiving said scaled second signal and a third signal, said signal summing stage providing a fourth signal having an echo signal removed therefrom;
    a second scalar coupled to said summing stage for receiving said fourth signal and providing a scaled fourth signal, said second scalar being responsive to said automatic gain control wherein a scaling rate of said second scalar is an inverse of a scaling rate of said first scalar; and
    an adaptive filter for receiving said first signal and generating said third signal that corresponds to said echo signal, said adaptive filter having said maximum coefficient.

2. The echo cancellation system as recited in claim 1 further comprising: a speaker, wherein said first signal is output to an acoustic environment through said speaker, and an audio signal is output to said acoustic environment; and
    a microphone coupled to said acoustic environment for generating said second signal.

3. The echo cancellation system as recited in claim 1 wherein said adaptive filter is a finite impulse response adaptive filter.

4. The echo cancellation system as recited in claim 1 wherein said automatic gain control is responsive to said first signal having an automatic gain control algorithm having a time constant at least 10 times greater than said automatic gain control algorithm corresponding to said second signal.

5. The echo cancellation system as recited in claim 4 wherein said adaptive filter is responsive to said fourth signal for determining coefficients of said adaptive filter.

6. The echo cancellation system as recited in claim 5 further including a delta scalar coupled for receiving previous coefficients of said adaptive filter and providing scaled coefficients to said adaptive filter, said delta scalar being responsive to said automatic gain control.

7. The echo cancellation system as recited in claim 5 further including a third scalar coupled for receiving said first signal and providing a scaled first signal to said adaptive filter, said third scalar being responsive to said automatic gain control.

8. The echo cancellation system as recited in claim 7 wherein a scale rate of said third scalar is equal to the scale rate of said first scalar.

9. The echo cancellation system as recited in claim 4 wherein said adaptive filter is responsive to said scaled fourth signal for determining coefficient of said adaptive filter.

10. The echo cancellation system as recited in claim 9 further including a third scalar coupled for receiving said third signal and providing a scaled third signal to said signal summing stage.

11. A method for implementing an automatic gain control algorithm for echo cancellation utilizing automatic gain control comprising the steps of:
    calculating short term far end energy;
    updating a voice activity decision flag corresponding to the far end energy;
    calculating a coefficient delta scalar when said voice activity decision flag indicates activity at the far end;
    updating a near end scalar when said voice activity decision flag indicates activity at the far end;
    scaling coefficients of an adaptive filter with said coefficient delta scalar to prevent coefficients from overflowing under dynamic conditions when said voice activity decision flag indicates activity at the far end, said sealing performed using a time constant in a range of 1–10 milliseconds;
    scaling a near end signal;
    performing echo cancellation;
    updating filter coefficients and
    removing scaling from an output signal.

12. The method as recited in claim 11 further including a step of repeating the steps on a frame by frame basis.

13. An echo cancellation system comprising:
    an automatic gain control unit for receiving a first signal and a second signal, said automatic gain control unit responsive to said second signal having an automatic gain control algorithm, wherin said automatic gain control algorithm has a time constant in a range of 1–10 milliseconds;
    a signal summing stage for receiving said second signal and a third signal, said signal summing stage providing a fourth signal at an output thereof;
    a first scalar coupled for receiving said first signal and providing a scaled first signal, said first scalar being responsive to said automatic gain control; and
    an adaptive filter coupled to said first scalar for receiving said scaled first signal and generating said third signal that corresponds to an echo signal wherein said adaptive filter is responsive to said fourth signal for determining coefficients and has said maximum coefficient.

14. The echo cancellation system as recited in claim 13 wherein said automatic gain control is responsive to said first signal having an automatic gain control algorithm having a time constant at least 10 times greater than said automatic gain control algorithm corresponding to said second signal.

* * * * *

UNITED STATES PATENT AND TRADEMARK OFFICE
CERTIFICATE OF CORRECTION

PATENT NO. : 7,142,665 B2 Page 1 of 1
APPLICATION NO. : 10/893034
DATED : November 28, 2006
INVENTOR(S) : Barron et al.

It is certified that error appears in the above-identified patent and that said Letters Patent is hereby corrected as shown below:

Column 14, line 29, "sealing" should be changed to --scaling--;
Column 14, line 42, "wherin" should be changed to --wherein--.

Signed and Sealed this

Third Day of July, 2007

JON W. DUDAS
*Director of the United States Patent and Trademark Office*